United States Patent
Press Frimet et al.

(10) Patent No.: US 12,000,014 B2
(45) Date of Patent: *Jun. 4, 2024

(54) PROCESS FOR RECOVERING METALS FROM RECYCLED RECHARGEABLE BATTERIES

(71) Applicant: BROMINE COMPOUNDS LTD., Beer-Sheva (IL)

(72) Inventors: Or Press Frimet, Lehavim (IL); Mohamad Masarwa, Lehavim (IL); Yaniv Englert, Beer-Sheva (IL); Eyal Barnea, Nesher (IL)

(73) Assignee: BROMINE COMPOUNDS LTD., Beer-Sheva (IL)

( * ) Notice: Subject to any disclaimer, the term of this patent is extended or adjusted under 35 U.S.C. 154(b) by 605 days.

This patent is subject to a terminal disclaimer.

(21) Appl. No.: 17/267,259

(22) PCT Filed: Aug. 4, 2019

(86) PCT No.: PCT/IL2019/050882
§ 371 (c)(1),
(2) Date: Feb. 9, 2021

(87) PCT Pub. No.: WO2020/031178
PCT Pub. Date: Feb. 13, 2020

(65) Prior Publication Data
US 2021/0317547 A1   Oct. 14, 2021

Related U.S. Application Data

(60) Provisional application No. 62/716,388, filed on Aug. 9, 2018.

(51) Int. Cl.
*C22B 26/12*   (2006.01)
*C22B 3/00*   (2006.01)
(Continued)

(52) U.S. Cl.
CPC ............. *C22B 26/12* (2013.01); *C22B 7/007* (2013.01); *C22B 9/023* (2013.01);
(Continued)

(58) Field of Classification Search
None
See application file for complete search history.

(56) References Cited

U.S. PATENT DOCUMENTS

| | | | |
|---|---|---|---|
| 7,078,122 B1 * | 7/2006 | Rosenberg | C22B 7/007 429/49 |
| 2021/0317547 A1 * | 10/2021 | Press Frimet | C22B 23/0484 |
| 2023/0080556 A1 * | 3/2023 | Press Frimet | C22B 26/12 75/743 |

FOREIGN PATENT DOCUMENTS

| | | |
|---|---|---|
| AU | 14295/76 | 12/1977 |
| AU | 498352 | 3/1979 |

(Continued)

OTHER PUBLICATIONS

International Search Report for PCT/IL2019/050882, dated Nov. 14, 2019, 6 pages.

(Continued)

*Primary Examiner* — Scott R Kastler
(74) *Attorney, Agent, or Firm* — Nixon & Vanderhye PC (57) ABSTRACT

The invention relates to hydrometallurgical method for recovering metals from spent energy storage devices. The method comprises combining aqueous hydrobromic acid leach solution and an electrode material of spent energy storage devices in a reaction vessel, dissolving the metals contained in the electrode material to form soluble metal bromide salts, removing elemental bromine, if formed, from the reaction vessel, separating insoluble material, if present, (Continued)

from the leach solution to obtain a metal-bearing solution and isolating one or more metals from said metal-bearing solution.

17 Claims, 3 Drawing Sheets

(51) Int. Cl.
| | |
|---|---|
| C22B 7/00 | (2006.01) |
| C22B 9/02 | (2006.01) |
| C22B 47/00 | (2006.01) |
| C25C 1/08 | (2006.01) |
| H01M 10/0525 | (2010.01) |
| H01M 10/54 | (2006.01) |

(52) U.S. Cl.
CPC ...... *C22B 23/0415* (2013.01); *C22B 23/0453* (2013.01); *C22B 23/0484* (2013.01); *C22B 47/00* (2013.01); *C25C 1/08* (2013.01); *H01M 10/0525* (2013.01); *H01M 10/54* (2013.01)

(56) References Cited

FOREIGN PATENT DOCUMENTS

| | | |
|---|---|---|
| CN | 108193050 | 6/2018 |
| CN | 108193050 | 10/2019 |
| JP | 2003-27273 | 1/2003 |
| JP | 2003-027273 | 1/2003 |
| JP | 2011-240287 | 12/2011 |
| WO | 01/08245 | 2/2001 |
| WO | 2017/118955 | 7/2017 |

OTHER PUBLICATIONS

Written Opinion of the ISA for PCT/IL2019/050882, dated Nov. 14, 2019, 5 pages.

Zhang et al., "Hydrometallurgical Process for Recovery of Metal Values From Spent Lithium-Ion Secondary Batteries", Hydrometallurgy 47, p. 259-271 (1998).

Freitas et al., "Electrochemical Recycling of Cobalt From Cathodes of Spent Lithium-Ion Batteries", Journal of Power Souces 171, p. 953-959 (2007).

Lithium Process Chemistry: Resources, Extraction, Batteries, and Recycling by Alexandre Chagnes and Jolanta Swiatowska, 3 pages, Elsevier (2015).

Arenas et al., "Electrodeposition of Platinum on Titanium Felt in a Rectangular Channel Flow Cell", Jounral of the Electrochemical Society, 164 (2) D57-D66 (2017).

Extended European Search Report dated Apr. 8, 2022 in corresponding European Application No. 19847542.8, 9 pages.

Mariam Melashvili et al., "Study of Gold Leaching with Bromine and Bromide and the Influence of Sulphide Minerals on This . . . ", Oct. 1, 2014, 13 pages.

\* cited by examiner

PROCESS FOR RECOVERING METALS FROM RECYCLED RECHARGEABLE BATTERIES

This application is the U.S. national phase of International Application No. PCT/IL2019/050882 filed 4 Aug. 2019, which designated the U.S. and claims the benefit of U.S. Application No. 62/716,388 filed 9 Aug. 2018, the entire contents of each of which are hereby incorporated by reference.

BACKGROUND AND SUMMARY

The use of rechargeable batteries (especially lithium batteries) in various devices such as electric vehicles, mobile phones, mobile computers etc. is in constant increase since they entered the market in the 1990s. Due to their extensive use, there is a need for efficient methods to recover metals from waste, for example, from spent lithium batteries. The negative electrode material in lithium-ion batteries consists of carbon/graphite (applied onto a current collector made of aluminum). The positive electrode material generally has the formula $Li_xM_yO_z$, where M stands for one or more transition metals; the lithium metal oxide is applied onto a current collector made of copper. The chief metal oxides that are most widely used to prepare the positive electrodes for lithium ion batteries include lithium cobalt oxide ($LiCoO_2$ or LCO), lithium manganese oxide ($LiMn_2O_4$ or LMO) lithium manganese nickel oxide ($Li_2Mn_3NiO_8$ or LMNO), lithium nickel manganese cobalt oxide ($LiNiMnCoO_2$ or NMC) and lithium nickel cobalt aluminum oxide ($LiNiCoAlO_2$ or NCA). Hence an effective recovery method should enable separation between lithium and the aforementioned transition metals.

Hydrometallurgical methods are well-suited to metal recovery from batteries and indeed leaching of metals from spent lithium-ion batteries, with the aid of various aqueous reagents, followed by selective precipitation of water-insoluble salts of the metals to accomplish metals recovery is known. For example, the use of concentrated hydrochloric acid was reported by Zhang et al. (Hydrometallurgy 47 p. 259-271 (1998)), showing the dissolution of lithium cobalt oxide in hydrochloric acid, separation of cobalt from the aqueous leach solution with solvent extraction using an extractant in kerosene, stripping the cobalt from the cobalt-loaded organic medium and precipitation of lithium in the form of the carbonate salt from the aqueous phase. A different approach towards recovery of precious metals from batteries was illustrated in Example 1 of WO 01/08245, where hydrochloric acid was used to leach the metals from cobalt-containing battery to produce the corresponding metal halides, following which sodium hydroxide was added to the solution, causing the precipitation of the transition metals in the form of the corresponding hydroxides. Lithium carbonate was subsequently isolated from the filtrate upon addition of sodium carbonate to precipitate lithium carbonate. However, to reach good leaching efficiency of the cathode material, hydrochloric acid would need the help of hydrogen peroxide to advance the dissolution of the cathode material by reducing $Co^{3+}$ to $CO^{2+}$ (dipositive cobalt dissolves readily). Addition of hydrogen peroxide that acts as a reductant is therefore needed to augment the leaching action of hydrochloric acid. See Freitas et al., Journal of Power Sources 171 p. 953-959 (2007) and also Lithium Process Chemistry: Resources, Extraction, Batteries, and Recycling by Alexandre Chagnes and Jolanta Swiatowska page 245, Elsevier (2015), discussing the addition of hydrogen peroxide as reducing agent to various leaching media, including hydrochloric acid, as illustrated by the reaction equation below showing dissolution of $LiCoO_2$ cathode material:

$$2LiCoO_2 + 6HCl + H_2O_2 \rightarrow 2CoCl_2 + 2LiCl + 4H_2O + O_2 \quad (1)$$

It has now been found that hydrobromic acid has several advantages over hydrochloric acid in the hydrometallurgical processing of spent lithium-ion batteries. Experimental results reported below indicate that hydrobromic acid achieves higher yield of metal leaching as compared to hydrochloric acid. An appreciable difference between the two acids was noted in the case of manganese-containing cathode materials: the leachability of manganese is greatly improved with the use of hydrobromic acid. This point is of significance, bearing in mind the trend in the industry to switch to manganese-containing cathodes.

Hydrobromic acid accomplishes the reductive leaching of cathode materials with good yield absent auxiliary reducing agent such as hydrogen peroxide. Usually bromide is oxidizable by the metal ions that are present in the cathode materials of lithium-ion batteries. That is, metals in the cathode materials that exist in high oxidation states, e.g., the trivalent cations $Co^{3+}$ and $Mn^{3+}/Mn^{4+}$, transform into the corresponding readily soluble divalent cations by gaining an electron from the bromide that is oxidized to generate elemental bromine.

Additionally, hydrobromic acid offers an easily manageable process design owing to the fact that elemental bromine—the co-product of the reductive leaching reaction—can be absorbed in an alkaline solution, e.g., sodium hydroxide, to form bromide and bromate ($BrO_3^-$) according to the following reaction equation (2):

$$3Br_2 + 6Na^+ + 6OH^- \rightarrow 5Br^- + BrO_3^- + 6Na^+ + 3H_2O \quad (2)$$

The so-formed bromate has been shown to be an effective precipitation reagent for divalent metals such as $Mn^{2+}$. That is, oxidative precipitation of dipositive metal ions such as $Mn^{2+}$ via oxidation and subsequent precipitation of manganese oxide enables separation of manganese from lithium.

The invention is therefore primarily directed to a hydrometallurgical method for recovering metals from spent energy storage devices (such as batteries and capacitors), comprising combining aqueous hydrobromic acid leach solution and an electrode material of said spent energy storage devices in a reaction vessel, dissolving the metals contained in the electrode material to form soluble metal bromide salts, removing elemental bromine, if formed, from the reaction vessel, separating insoluble material, if present, from the leach solution to obtain a metal-bearing solution and isolating one or more metals from said metal-bearing solution.

The electrode material comprises a mixed metal oxide, with at least one, preferably at least two, transition metal(s). As pointed out above, the invention particularly suits the needs of lithium ion battery recycling technologies, where the cathode material comprises lithium transition metal oxides such as lithium cobalt oxide, lithium manganese oxide, lithium manganese nickel oxide, lithium nickel manganese cobalt oxide and lithium nickel cobalt aluminum oxide. However, mixed metal oxides are often used in other types of batteries as catalysts and their recovery is also contemplated by the invention. It should be noted that the metals can be isolated from the metals-bearing solution by a variety of techniques, namely, isolation by precipitation with the aid of added precipitation reagents optionally under pH adjustment (for example, alkali hydroxide, alkali carbonate); oxidative precipitation (with the aid of an oxidizer such as bromate); or by electrodeposition, e.g., cathodic deposition. Other separation methods based on ion exchange resin with affinity towards particular metals and solvent extraction can also be employed to isolate the individual metals, e.g., separate between the transition metals and the lithium in the recycling of lithium ion batteries.

DETAILED DESCRIPTION

Figure 1:
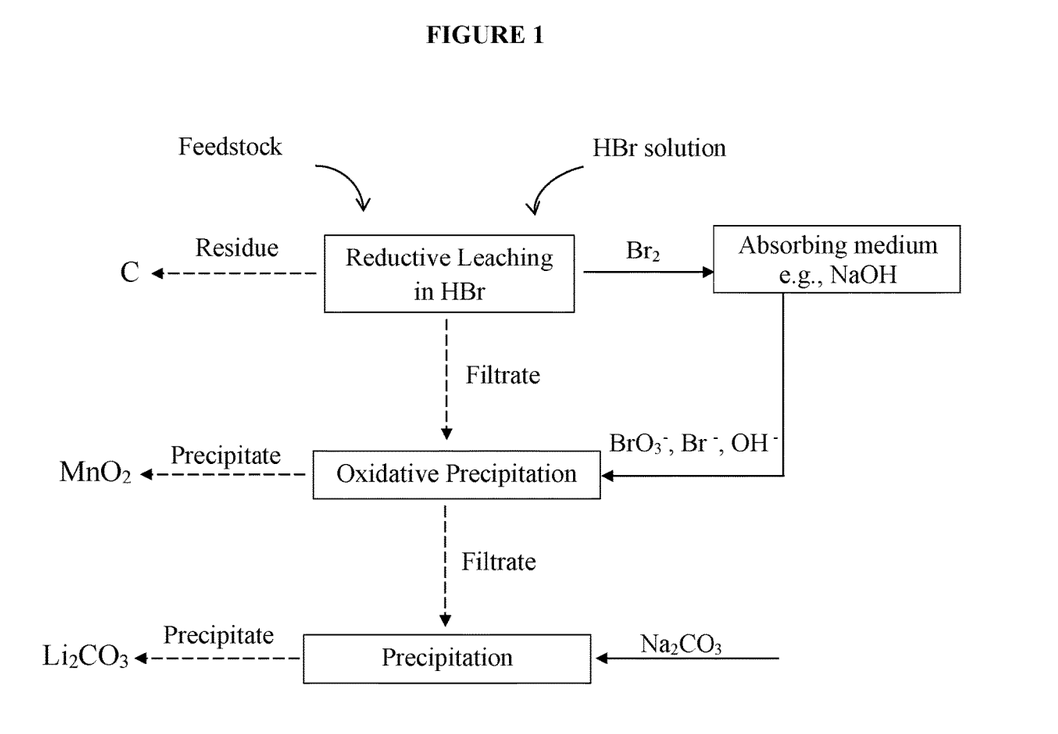
FIG. 1 is a flowchart illustrating a process of reductive leaching, oxidative precipitation of a transition metal, and precipitation of lithium.

FIG. 1 is a flowchart illustrating one preferred variant of the process that consists of three major steps: reductive leaching; oxidative precipitation of a transition metal such as manganese; and lastly, precipitation of lithium. Dashed arrows indicate solid/liquid separation, with the downwardly directed arrow showing the filtrate that moves on to the next step. Particularly, the process illustrated in FIG. 1 is based on the use of hydrobromic acid in the reductive leaching of lithium and manganese-containing cathode material, followed by the use of an indigenously generated bromate in the oxidative precipitation of the dissolved manganese to give manganese oxide, and subsequent precipitation of lithium carbonate. We use the term "indigenously generated bromate" to indicate the bromate obtained from the elemental bromine liberated in the leaching step, as shown in FIG. 1. But it should be understood that the invention is not limited to the specific features set out in the flowchart of FIG. 1: the invention is readily amenable to recovery of different transition metals that are incorporated in lithium ion batteries, such as cobalt and nickel. Once successfully leached by hydrobromic acid, these metals are separable from the metals-bearing solution by the previously mentioned techniques.

Suitable feedstock of the process consists of electrode material in a particulate form that is recovered from spent lithium ion batteries by conventional industrial recycling processes. Electrode material, named 'black mass' in the industry, is isolated from battery cells following several treatment stages, depending on the type of technology utilized by the recycling industry. The methods by which the black mass is collected do not form part of this invention and need not be described in detail. For example, the black mass is recovered after A) discharged batteries are dismantled to remove auxiliary parts (plastic components, electronic components, cables, connectors) to recover the battery cells; and B) battery cells undergo a series of mechanical processing steps including crushing and grinding to obtain the electrode material in a particulate form.

Other recycling technologies include A) disassembling the batteries to collect the electronic and plastic parts as above, B) pyrolysis of battery cells (known as vacuum thermal recycling) whereby batteries are deactivated and volatile organic electrolytes are removed due to evaporation and C) deactivated pyrolyzed cells undergo mechanical treatment (crushing, grinding and sorting) to collect a fine fraction consisting of the electrode powder. See, for example, Georgi-Maschler et al., Journal of Power Sources 207 p. 173-182 (2012), describing methods to recover the precious electrode material from lithium-ion batteries. Depending on the technology employed by the recycler, the feedstock may include, in addition of course to the cathode material (e.g., $LiCoO_2$, $LiMn_2O_4$, $Li_2Mn_3NiO_8$, LiNiMn-$CoO_2$ and $LiNiCoAlO_2$) also the graphite anode material and aluminum and copper (the metals of which the current collector foils in the batteries are made of). A series of leaching tests reported below indicate that the dissolution of the cathode material in hydrobromic acid advances satisfactorily even in the presence of graphite.

The leach solution used in the process consists of aqueous hydrobromic acid with HBr concentration varying in the range from 10 to ~48 wt %, for example, from 15 to 48 wt %, e.g. 15-35 wt %. The loading of the black mass may be up to 35% wt %, e.g., from 7-35 wt %.

The electrode material (e.g., in the form of black mass or mixture of metals) in a particulate form (e.g., ground material) and the hydrobromic acid are introduced into a leaching reactor and a slurry is formed. Suitable solid/liquid ratio, namely, the proportion between the leachable solid electrode material and the aqueous hydrobromic acid leach solution added to the leaching reactor is from 1/99 to 30/70, (usually from 1/99 to 6/94, e.g., 1/99 to 4/96, when metals mixture is subjected to leaching; in case of black mass, which contains significant fraction of carbon, lesser amount of leach solution is needed and workable ratio is from 10/90 to 30/70). The reactor is equipped with (e.g., mechanical) agitation systems to enable continuous mixing of the slurry. Another requirement is that the reactor design includes removal and absorption of the evaporated co-product, i.e., elemental bromine vapors.

The cathode material dissolves gradually, usually with concomitant generation of elemental bromine. The dissolution time of the electrode material in the leaching reactor increases with increasing solid/liquid ratio and decreases with increasing temperature and acid concentration. It is possible to achieve fairly good leaching efficiencies for a variety of cathode materials during a reasonable period of time at room temperature but it is generally preferred to perform the leaching under heating, at a temperature range from 40 to 90° C. For example, the temperature at the leaching reactor can be maintained at about 45 to 65° C., i.e., around the boiling point of elemental bromine. At these temperatures, bromine is removed more rapidly.

The removal of the elemental bromine, if formed, is further facilitated by conventional methods. For example, the slurry in the leaching reactor is stripped with a suitable purge gas such as air or nitrogen; bromine vapors are discharged from the reactor by the outgoing gas stream. The bromine-bearing gas is led to a suitable absorption medium. Preferably vaporizing and expelling the free bromine is achieved by blowing out with a current of air; bromine is absorbed from the air stream by scrubbing with an alkali solution, e.g., aqueous solution of sodium hydroxide at a concentration of 5 to 45% by weight, to convert elemental bromine into bromate and bromide as shown by reaction equation (2) above.

As pointed out earlier, the feedstock may be a mixture consisting of cathode and anode (carbon). The latter remains as a solid residue in the leach solution. Cessation of the evolution of elemental bromine (with its characteristic red color) may indicate that the leaching reaction has reached completion or is about to end. But the progress of the leaching can also be determined by withdrawing samples from the leach solution to measure the concentration of the progressively dissolving metals and assess the leaching yield, for example, by inductively coupled plasma mass spectroscopy (ICP-MS).

Upon completion of the leaching operation, the content of the leaching reactor undergoes solid/liquid separation to remove insoluble material (graphite anode material and perhaps remnant of the cathode material) and collect the filtrate. The filtrate constitutes the metal-bearing solutions from which the precious metals are to be recovered. It was already mentioned above that the isolation of the metals could be achieved with a variety of methods. Some preferred methods for metal separation are described now in more detail: oxidative precipitation with added bromate, separation by electrodeposition of the transition metal and separation by precipitation with added reagents such as alkali hydroxide, alkali carbonate and complexation agents of the relevant transition metals.

Separation with oxidative precipitation—the method illustrated in the flowchart of FIG. 1—can be accomplished with an oxidizing agent such as bromate, namely, bromate-containing aqueous stream that is added to the metal-bearing solution; in particular, the indigenously generated bromate is returned to the process to oxidize divalent manganese to form $MnO_2$. The pH is adjusted to the preferred range, roughly $3.55 \leq pH \leq 5$ owing to the alkalinity of the absorption basic solution (extra sodium hydroxide solution can be added separately to the metal-bearing solution if needed). The bromate concentration in the returned aqueous stream may vary from 7 to 12 wt %. Hence about 1.1 mole of the indigenously generated bromate stream would be required to oxidize 3 mole of dissolved $Mn^{2+}$. If needed, fresh bromate salts can be added to the indigenously generated bromate stream to meet precipitation requirements yet minimize the volumes of recycled streams. Alternatively, bromate can be supplied in its entirety to the metal-bearing solution in a solid form, i.e., by the addition of commercially available alkali bromate to the metal-bearing solution, or by injecting aqueous solutions made by dissolving commercial salts. The oxidative precipitation of manganese is not limited to the use of bromate and other oxidizing agents, e.g., potassium permanganate, can be used, as shown by reaction equation (3):

$$3Mn^{2+} + 2MnO_4^- + 2H_2O \rightarrow 5MnO_2 + 4H^+$$

Experimental work conducted in support of this invention shows that following the leaching of $LiMn_2O_4$ and black mass which include other cathode materials, manganese can be selectively precipitated from the metal-bearing solution by oxidative precipitation using bromate, reaching more than ~90% yield (calculated on the basis of the amount of soluble manganese in the metals-bearing solution) whereas ~100% of the lithium remains dissolved in the solution. That is, lithium ions and dipositive transition metal ions are efficiently separable with the aid of bromate. Hence the use of hydrobromic acid and indigenously generated bromate offers an elegant approach towards the reductive leaching of cathode material followed by oxidative precipitation of the transition metal.

As shown by the flowchart in FIG. 1, lithium is recovered from the solution after the removal of manganese by addition of alkali carbonate, alkali hydroxide or carbon dioxide. Lithium carbonate exhibits an abnormal solubility curve, hence precipitation may take place at a temperature in the range from 0 to 100° C. The precipitate is usually collected by filtration, washed and dried, to obtain lithium carbonate with an acceptable purity.

Figure 2:
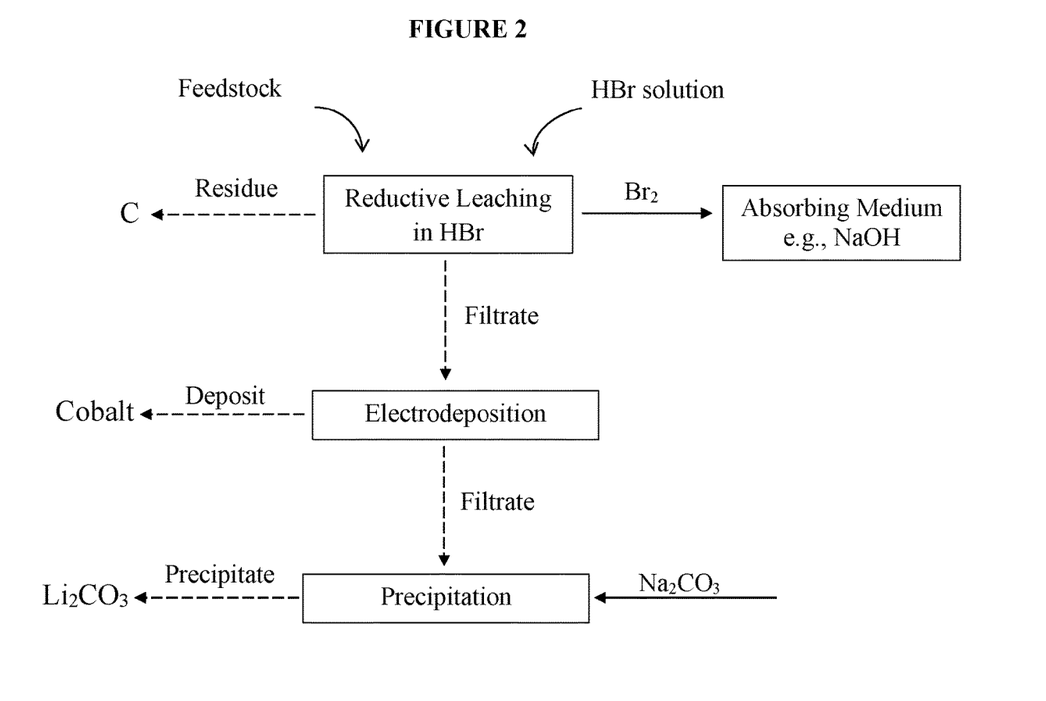
FIG. 2 is flowchart including separation of a transition metal by electrodeposition.

Separation by electrodeposition of the transition metal is illustrated in the flowchart of FIG. 2. In the case of FIG. 2, the feedstock comprises $LiCoO_2$; the leaching step is as described above. In general, electrodeposition of the transition metal (e.g., Co) in an elemental form onto an electrode can be achieved with conventional electrochemical techniques, e.g., (i) galvanostatic method, with constant current density set in the range from, for example, $4*10^{-4}$ to $2.5*10^{-3}$ A $m^{-2}$ (ii) potentiostatic method, at a constant potential set in the range between, for example, $-1.5V$ and $1$ V; and (iii) cyclic voltammetry, using either two or three-electrodes cell configuration. The deposit is obtained in a highly pure form.

For example, electrodeposition of $Co^{(0)}$ may be performed in a 3-electrode cell configuration, applying conditions similar to those reported by Freitas et al. (supra) where the working electrode to be coated was aluminum foil, platinum served as the counter electrode, and Ag/AgCl/NaCl as a reference electrode. The electrodes are immersed in the metal-bearing solution (pH may be adjusted) and a cathodic potential is applied on the working electrode for cobalt reduction, i.e., either a fixed voltage or variable voltage that is varied linearly with time.

Electrodeposition of the transition metal (e.g. cobalt) from the metal-bearing solution can also be achieved using a flow cell divided into cathodic and anodic compartments. With such configuration, the metal-bearing solution is recirculated through the cathodic side at a suitable rate while an electrolyte solution (e.g., sodium bromide solution) flows through the anodic side. An outline of a flow cell suitable for use in electrodeposition of metals, equipped with reservoirs for holding the respective plating solution and counter electrolyte solution and pumps for recirculating the solutions can be found in a paper by Arenas et al., Journal of The Electrochemical Society, 164 D57-D66 (2017). For example, experimental results reported below indicate that cobalt can be electrodeposited from ~5.0 wt % Co-containing leachate onto the cathode in a three-electrode flow cell configuration under galvanostatic control where the working electrode (cathode) and anode consist of carbon felts supported onto current collectors in the form of carbon plates (reference electrode was Ag/AgCl), by applying $4*10^{\wedge}(-4)$ to $2.5*10^{\wedge}(-3)$ A $m^{-2}$ for at least 60 minutes at room temperature. Electrodes other than carbon felts can also be coated by the electrodeposited cobalt.

Another separation method consists of adding a precipitation reagent to the metals-bearing solution (i.e., the filtrate collected after the leaching step). A suitable precipitation reagent may be selected from the group consisting of alkali hydroxide (e.g., NaOH), alkali bicarbonate (e.g., $NaHCO_3$), alkali carbonate (e.g., $Na_2CO_3$) and dimethylglyoxime. Under suitable pH adjustment of the metal-bearing solution, the aforementioned reagents were shown to be effective in separating the metals under consideration. The precipitation reagents may be added in a solid form or as aqueous solutions to induce precipitation. The precipitate is then separated by conventional techniques such as filtration, decantation and centrifugation, and the supernatant collected proceeds to the next separation step.

For example, manganese and lithium are separable from one another upon addition to the metal bearing solution of alkali hydroxide (NaOH) or alkali carbonate ($Na_2CO_3$), at slightly alkaline pH ($7.0 \leq pH \leq 9.0$), whereby manganese selectively precipitates from the solution while lithium remains in a soluble form. Likewise, cobalt and lithium are separable from one another with the help of sodium hydroxide (e.g., at 7.5≤pH≤9.0); or sodium carbonate (e.g., at 7.5≤pH≤9.0, in particular around pH=8.0) or sodium bicarbonate (e.g., at 7.0≤pH≤8.0).

Thus, the invention provides a method wherein the isolation of metals from the metal-bearing solution produced after the leaching step (e.g., leaching of particulate cathode material from industrially crushed spent lithium ion batteries) involves at least two, or at least three, or all of the following steps, which can be conducted in any order:
- isolating nickel by precipitation, using a first precipitating reagent (especially chelating agent such as dimethylglyoxime);
- isolating cobalt by electrodeposition, and collecting cobalt from a plated cathode, e.g., carbon cathode;
- isolating manganese by oxidative precipitation, using an oxidizer (preferably bromate as described above); and
- isolating lithium by precipitation, using a second precipitating reagent (e.g., water soluble carbonate or hydroxide, carbon dioxide).

Preferably, nickel is the first metal to be isolated. Usually, lithium is the last metal to be isolated.

Figure 3:
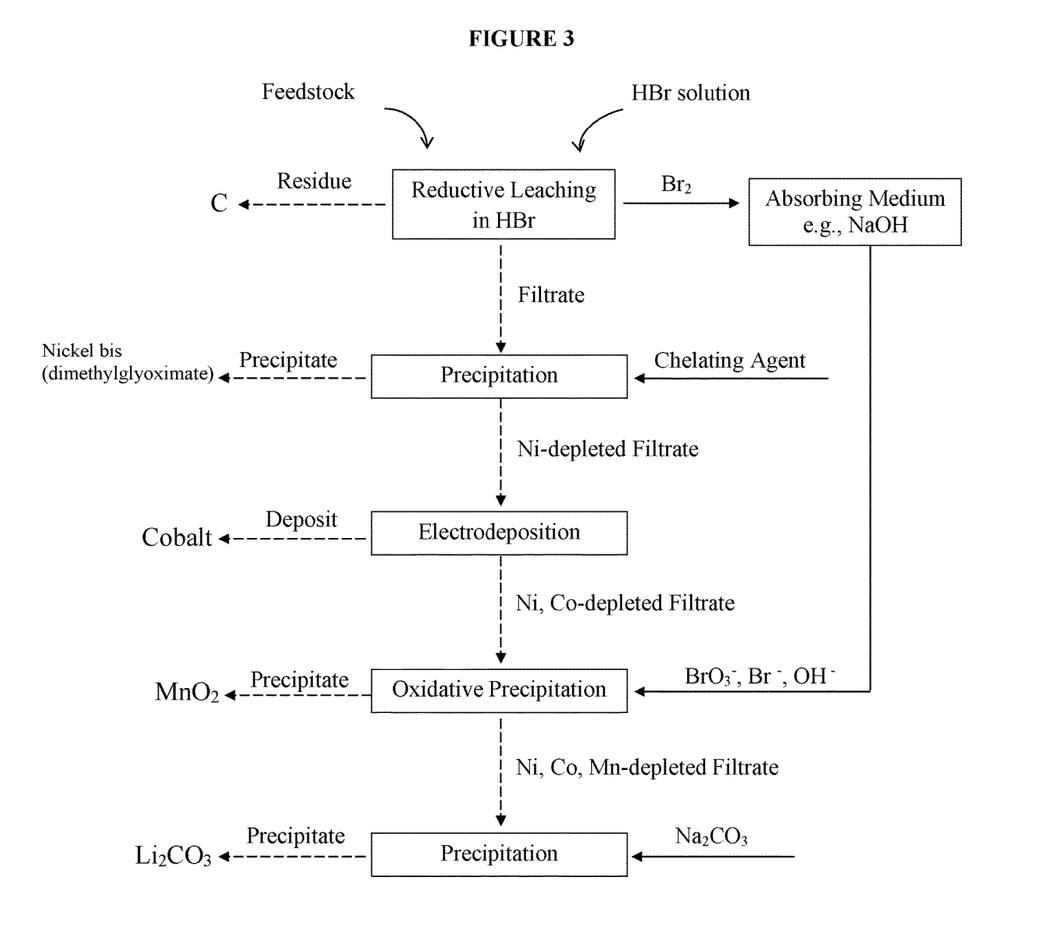
FIG. 3 is a flowchart showing a process of selectively separating metals from a metal-bearing solution.

A useful method of selectively separating the abovementioned four metals from the metal-bearing solution is illustrated in FIG. 3. The method consists of the following sequence of steps (it should be noted that the order of steps set forth below is not mandatory and a different order of steps may also be effective in recovery of the metals):
- adding chelating agent such as dimethylglyoxime to the metal-bearing solution to precipitate a nickel complex, e.g., nickel bis(dimethylglyoximate), recovering the nickel complex and collecting Ni-depleted metal bearing solution;
- electrodepositing cobalt from the Ni-depleted metal bearing solution, to obtain cobalt deposit onto an electrode surface and collecting Ni, Co-depleted solution;
- adding an oxidizer such as bromate to Ni, Co-depleted metal bearing solution to precipitate an oxide of manganese, separating said oxide of manganese and collecting Ni, Co and Mn-depleted metal bearing solution;
- adding a second precipitation reagent to the Ni, Co and Mn-depleted metal bearing solution, for example, a water-soluble hydroxide, carbonate or carbon dioxide, to precipitate lithium hydroxide or carbonate, respectively, and separating the lithium hydroxide or carbonate.

The order of steps may be reversed. For example, removal of manganese may take place before the recovery of cobalt, such that cobalt is electrodeposited from Ni, Mn-depleted bearing solution.

EXAMPLES

Methods

Inductively coupled plasma (ICP) was used to determine metal content in the feedstock and in solution; the ICP instrument was ICP VISTA AX, Varian Ltd or ICP 5110, Agilent Technologies. Recovery percentage (yield) was calculated, e.g., by [M]solution/[M]feedstock×100, where [M] indicates the measured weight of metal M in the solution and the feedstock, respectively.

Example 1 (of the Invention) and 2 (Comparative) $LiCoO_2$ Leaching with Hydrobromic Acid (of the Invention) and Hydrochloric Acid (Comparative)

$LiCoO_2$ (1.5 g, purchased from Sigma Aldrich) was added to a vessel that was previously charged with 98.5 g of an aqueous solution of the hydrohalic acid (15 wt %). The dissolution tests were carried out at 56.4° C. under stirring over a time period of two hours. When HBr was used, a reddish solution was formed, indicative of the evolution of elemental bromine. Bromine vapors were absorbed in a column charged with sodium hydroxide. Results of the leaching test are set out in Table 1.

TABLE 1

| Example | Leaching agent | Cobalt recovery (%) | Lithium recovery (%) |
|---|---|---|---|
| 1 | Hydrobromic acid | 96.22 | 85.68 |
| 2 | Hydrochloric acid | 71.68 | 76.76 |

Example 3 (of the Invention) and 4 (Comparative) $LiMn_2O_4$ Leaching with Hydrobromic Acid (of the Invention) and Hydrochloric Acid (Comparative)

$LiMn_2O_4$ (1.5 g, purchased from Sigma Aldrich) was added to a vessel which was previously charged with 98.5 g of an aqueous solution of hydrohalic acid (15 wt %). The dissolution tests were carried out at 40° C. under stirring over a time period of 10 minutes. For HBr, a reddish solution was formed, indicative of the evolution of elemental bromine. Bromine vapors were absorbed in a column charged with sodium hydroxide. Results of the leaching test are set out in Table 2.

TABLE 2

| Example | Leaching agent | manganese recovery (%) | lithium recovery (%) |
|---|---|---|---|
| 3 | Hydrobromic acid | 86.30 | 88.50 |
| 4 | Hydrochloric acid | 55.90 | 83.24 |

Examples 5 to 7

Leaching of Lithium Metal Oxides with Hydrobromic Acid in the Presence of Graphite To assess the ability of hydrobromic acid to dissolve lithium metal oxides effectively in the presence of added graphite (the anode material in lithium-ion batteries), the procedure described in previous examples was repeated with the addition of graphite to the vessel. The experimental conditions (leaching temperature and time, acid concentration and concentration of lithium metal oxide in the acid solution) and the results are set out in Table 3 below (average results based on triplicate repetition). Graphite/pure metal oxide weight ratio was ⅛ in all experiments.

TABLE 3

| Ex. | $Li_xM_yO_z$ (wt %) | HBr (wt %) | T (° C.) | time (h) | transition metal recovery (%) | lithium recovery (%) |
|---|---|---|---|---|---|---|
| 5 | $LiCoO_2$ | 15 | 60 | 2 | Co: 92.7 | 82.10 |
| 6 | $LiMn_2O_4$ | 15 | 25 | 2 | Mn: 98.8 | 84.8 |
| 7 | $Li_2Mn_3NiO_8$ | 15 | 90 | 2 | Mn: 100 Ni: 97.8 | 74.09 |

The results indicate that the presence of graphite (the anode material in lithium ion batteries that may be part of the black mass isolated by the recycling industry) does not interfere with the good leaching action of hydrobromic acid.

Example 8

Effect of Temperature and Acid Concentration on the Leachability of Lithium Metal Oxides with Hydrobromic Acid The leachability of lithium mixed metal oxide (for example LiNiCoAlO$_2$) was investigated over a broad concentration range of acidic leach solution at 50° C. The general procedure consists of adding the mixed metal oxide to hydrobromic acid solutions with varying concentration (15 wt %, 24 wt % and 35 wt %), keeping the leach solution under heating at the selected temperature and recording the period of time until full dissolution of the added solid is observed (determined by visually inspecting the sample). Solid/liquid ratio was constant at (1/99) in all tested samples.

The leaching times are tabulated in Table 4. It is seen that at around 50° C., dissolution of the lithium mixed metal oxide is achieved fairly rapidly for all three test solutions. That is, across the 15-35 wt % concentration range.

TABLE 4

| HBr concentration, wt% | Temperature, ° C. | Time, min |
|---|---|---|
| 15 | 50 | 22 |
| 24 | 50 | 10 |
| 35 | 50 | 3 |

Example 9

Isolation of Metals by Electrodeposition

A series of electrodeposition tests was performed. The experimental set-up consists of a two-compartment flow cell. The two compartments were separated by a separator film. Carbon felts with a surface area of 1000-1500 m$^2$/gr were used as electrodes supported by carbon plates as current collectors (the weight of the felts was about 0.4 gr). A reference Ag/AgCl electrode was used to monitor the electrodes redox potential.

118 grams of a cobalt-containing leachate (obtained as shown by previous examples) were added to the 0.2 L cathodic compartment. The counter solution added to the anodic side was 35% wt NaBr solution. The flow cell was connected to the catholyte and anolyte reservoirs and the solutions were recirculated parallelly through the counter flow cell.

Elemental cobalt was electrodeposited on the felt at the cathode half-cell by using a chronopotentiometry method, in which a constant current is supplied to the electrode and a sudden change in the measured potential indicates that the electrodeposition reaction was completed. In each experiment, a constant current in the range between 1 and 3 A was applied. For a solution with 4.7 wt % Co$^{2+}$, the electrodeposition process with a current of 3 A ended approximately after 90 minutes.

Example 10

Recovering Manganese from Black Mass by Leaching Followed by Oxidative Precipitation with Bromate Leaching Step 300 gram of cathode material (black mass obtained from a recycling company) were added to 1700 grams of 35% wt hydrobromic acid solution that was heated to 60° C. prior to the addition of the black mass.

The mixture was stirred over 3 hours and then filtered to separate the residual solids from the aqueous solution. The filtrate, consisting of the metals-bearing solution, was collected. The filter cake was washed with 50 grams of slightly acidic DW (pH=4-6) solution and the washing solution was combined with the filtrate.

Bromine that evolved during the leaching stage was absorbed in a 15-25% (% wt) sodium hydroxide scrubber until NaOH concentration was decreased to 5%.

Separation of Manganese from the Filtrate 1500 gram of the filtrate were charged to a 2 L reactor. The scrubber solution, consisting of BrO$_3^-$, Br$^-$ and NaOH was added to the reactor until the pH value was steady in a range of 3.5<pH<5. The precipitate, consisting of manganese oxide was separated by filtration and the manganese-free filtrate was collected.

Example 11

Sequential Recovery of Nickel, Cobalt and Manganese from Black Mass by Leaching Followed by Selective Precipitation, Electrodeposition and Oxidative Precipitation Leaching Step 240 gram of cathode material (black mass obtained from a recycling company) were gradually added over thirty minutes to 960 grams of 48% wt hydrobromic acid solution that was heated to 60° C. prior to the addition of the black mass. After the addition was completed, the reaction mixture was stirred for three hours. The sample was filtered on a Buchner with 56 mm glass-fiber filter under vacuum. Metal concentrations were analyzed using ICP.

Bromine that evolved during the leaching stage was absorbed in a 15-25% (% wt) sodium hydroxide scrubber until NaOH concentration was decreased to 5%.

The leaching yield of various metals is tabulated in Table 5.

TABLE 5

| Li yield, % | Ni yield, % | Co yield, % | Mn yield, % |
|---|---|---|---|
| 96.2 | 93 | 94 | 94.7 |

Selective Separation of Metals from the Leachate

Nickel, cobalt and manganese were consecutively separated from the leachate:

Ni was recovered from the leachate by selective precipitation with the aid of dimethylglyoxime. 4.2 gr dimethylglyoxime (DMG) were added to 987.4 gr leachate that contained 0.11 wt % Ni, such that the molar ratio DMG:Ni was 2:1. The pH of the mixture was raised to pH=4.4 using 91.5 gr of 20 wt % Na$_2$CO$_3$ solution. When the pH value reached pH=3.5, the leachate attained a pinkish color. The leachate was filtered on 110 mm Whatman grade 41 ash less filter paper.

The composition of the mother liquor, obtained after the precipitation and filtration of nickel bis(dimethylglyoximate), was analyzed to determine nickel (and other metals) percentage removal. Results are tabulated in Table 6, indicating the selectivity of the precipitating reagent towards nickel removal.

TABLE 6

| Ni removal, % | Li removal, % | Co removal, % | Mn removal, % |
|---|---|---|---|
| 87 | 6.9 | 0 | 0 |

Next, cobalt was recovered from the nickel-depleted leachate by electrodeposition. 67.5 gr of the nickel-depleted leachate solution with 4.7 wt % $Co^{2+}$ was added to the cathodic side of the divided electrochemical flow-cell that was described in Example 9. The solution in the anodic side consisted of 35 wt % aqueous sodium bromide. Circulation rates generated by the peristaltic pump (Watson Marlow 323) in the flow cell were 40-60 rpm. A current of 3 A was applied over a period of 90 minutes. pH was maintained at 4-4.5 by addition of sodium hydroxide solution.

At the end of the electrolysis, it was found that the weight of the catholyte decreased to 53.7 gr. The weight of the carbon felt which served as cathode increased by ~2.9 gr. The felt and the membrane separator were placed in 24 wt % HBr at 45° C. for 3 hours, to dissolve the metal plating formed during the electrolysis. The resultant solution was filtered on 70 mm glass fiber filter (Whatman). Filtrate was analyzed to determine the composition of the electroplated metals. Results are tabulated in Table 7, indicating the selectivity of the electrolysis towards cobalt removal.

TABLE 7

| Metal | Co | Li | Ni | Mn | Other metals |
|---|---|---|---|---|---|
| Wt % in the electroplating | 91.46 | 0.96 | 0.54 | 5.6 | ~1.0 |

Next, manganese recovery was achieved with 25 wt % $NaBrO_3$ solution. 900 gr $NaBrO_3$ solution were gradually added to 738 gr of the nickel-cobalt depleted leachate solution over one hour. During the $NaBrO_3$ addition, the pH value increased from pH<1 to pH≈4. A precipitate was formed. The sample was filtered on a 110 mm Whatman grade 41 ash less filter paper. The wet cake weight was 24.8 gr, and filtrate weight was 1576 gr. Removal percentage of metals from the solution are tabulated in Table 8, indicating the selectivity of this stage towards manganese removal.

TABLE 8

| Mn removal, % | Li removal, % | Ni removal, % | Co removal, % |
|---|---|---|---|
| 93.3 | 5 | 8.2 | 5.5 |

The invention claimed is:

1. Hydrometallurgical method for recovering metals from spent energy storage devices, comprising combining aqueous hydrobromic acid leach solution and an electrode material of spent energy storage devices in a reaction vessel, wherein the electrode material comprises mixed metal oxide with one or more transition metals, one of which is manganese, dissolving the metals contained in the electrode material to form soluble metal bromide salts, removing elemental bromine from the reaction vessel, separating insoluble material, if present, from the leach solution to obtain a metal-bearing solution and isolating one or more metals, one of which is manganese, from said metal-bearing solution.

2. A method according to claim 1, wherein the electrode material comprises a cathode material of spent lithium ion batteries selected from the group consisting of lithium manganese oxide ($LiMn_2O_4$), lithium manganese nickel oxide ($Li_2Mn_3NiO_8$) and lithium nickel manganese cobalt oxide ($LiNiMnCoO_2$).

3. A method according to claim 1, wherein the metals are isolated from the metal-bearing solution by precipitation, oxidative precipitation or electrodeposition.

4. A method according to claim 3, wherein metal isolation by precipitation is achieved by addition of a precipitating reagent to the metal-bearing solution, metal isolation by oxidative precipitation is achieved by addition of an oxidizer to the metal-bearing solution, and metal isolation by electrodeposition is achieved by cathodic deposition.

5. A method according to claim 1, comprising absorbing the elemental bromine liberated in the leaching in an alkaline solution to create bromate-containing solution, and using said bromate-containing solution as an oxidizer for oxidative precipitation to isolate manganese which is isolated from the metal-bearing solution by oxidative precipitation in the form of manganese dioxide with the aid of the bromate.

6. A method according to claim 4, wherein the electrode material comprises cobalt which is isolated from the metal-bearing solution by electrodeposition in the form of elemental cobalt.

7. A method according to claim 4, wherein the electrode material comprises nickel which is isolated by precipitation from the metal-bearing solution by addition of a precipitation reagent which is a chelating agent.

8. A method according to claim 4, wherein the electrode material comprises lithium which is isolated by precipitation from the metal-bearing solution by addition of a precipitation reagent which is a water-soluble carbonate salt.

9. A method according to claim 3, comprising isolating manganese by oxidative precipitation and one or more of the following:
   isolating nickel by precipitation;
   isolating cobalt by electrodeposition; and
   isolating lithium by precipitation;
   wherein lithium is the last metal to be isolated.

10. A method according to claim 2, further comprising isolation of cobalt and lithium.

11. A method according to claim 2, comprising isolation of manganese and lithium.

12. A method according to claim 2, comprising isolation of nickel, manganese and lithium.

13. A method according to claim 2, further comprising isolation of nickel, cobalt and lithium.

14. A method according to claim 2, comprising isolation of nickel, cobalt, manganese and lithium.

15. A method according to claim 9, wherein: nickel is isolated by precipitation using dimethylglyoxime;
    cobalt is isolated by cathodic deposition on carbon;
    manganese is isolated by oxidative precipitation using bromate, said bromate being generated by absorbing in alkali hydroxide the elemental bromine which evolves during the leaching; and lithium is isolated by precipitation using alkali carbonate, carbon dioxide or alkali hydroxide.

16. A method according to claim 14, wherein the metals are isolated from the metal-bearing solution by the following sequence:
- adding chelating agent to the metal-bearing solution to precipitate a nickel complex, separating the nickel complex and collecting Ni-depleted metal bearing solution;
- electrodepositing cobalt from the Ni-depleted solution, to obtain cobalt deposit onto a cathode surface and collecting Ni, Co-depleted solution;
- adding an oxidizer to Ni, Co-depleted solution to precipitate an oxide of manganese, separating said oxide of manganese and collecting Ni, Co and Mn-depleted metal bearing solution; adding a water-soluble hydroxide, a water-soluble carbonate or carbon dioxide to said Ni, Co and Mn-depleted metal bearing solution to precipitate lithium hydroxide or carbonate and separating the lithium hydroxide or carbonate.

17. A method according to claim 1, wherein the hydrobromic acid accomplishes reductive leaching of cathode materials absent auxiliary reducing agent.

* * * * *